June 15, 1926. 1,588,585
J. KEARNS ET AL
METHOD OF AND APPARATUS FOR BUILDING PNEUMATIC CORD TIRES
Filed Nov. 19, 1923   5 Sheets-Sheet 3
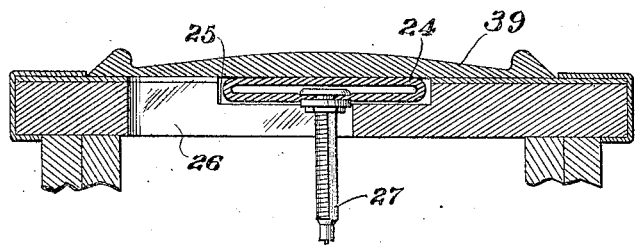
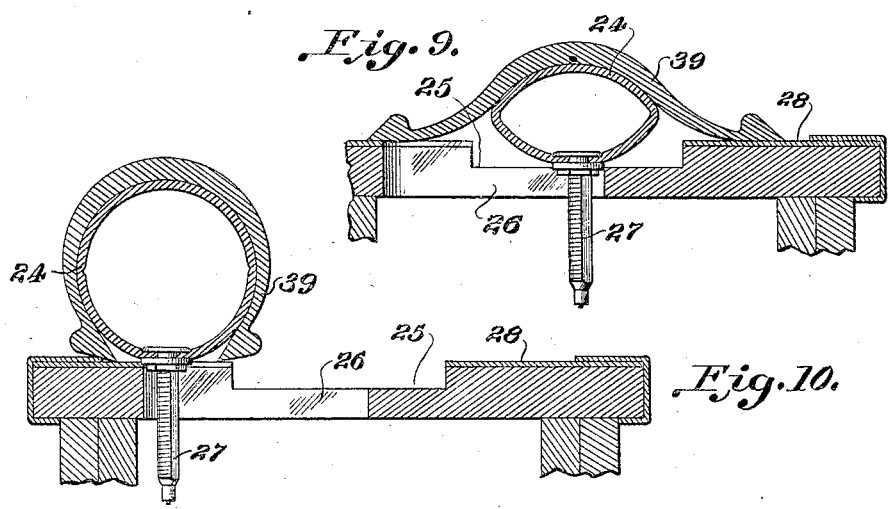
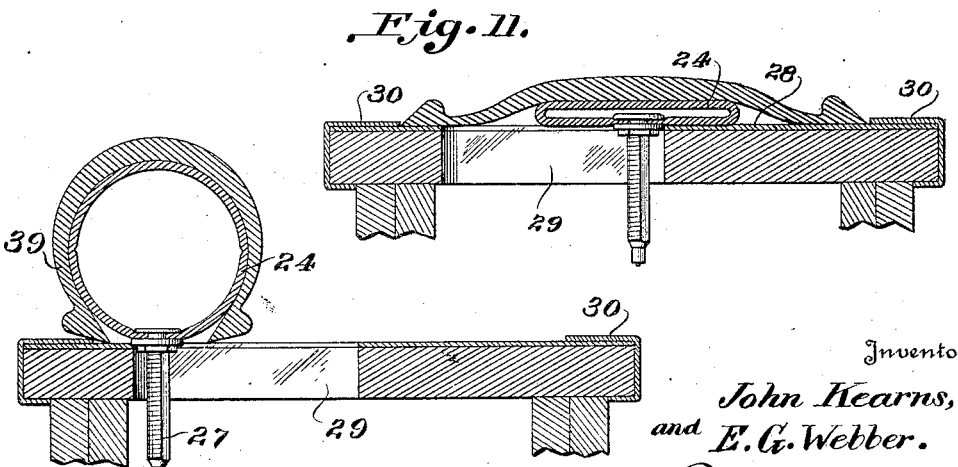
Inventors
John Kearns,
and E. G. Webber.
By Parker Cook
Attorney June 15, 1926.　　　　　　　　　　　　　　　1,588,585
J. KEARNS ET AL
METHOD OF AND APPARATUS FOR BUILDING PNEUMATIC CORD TIRES
Filed Nov. 19, 1923　　　5 Sheets-Sheet 4
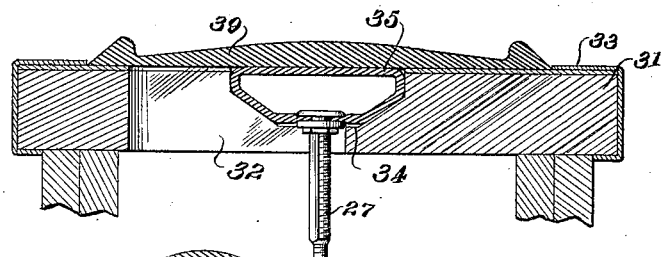
Fig. 12.
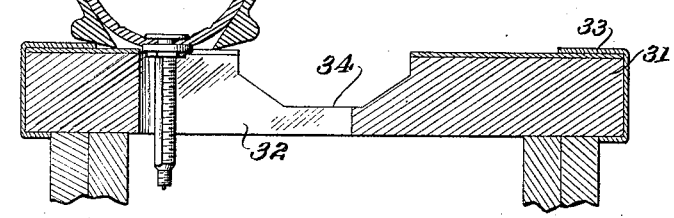
Fig. 12ª
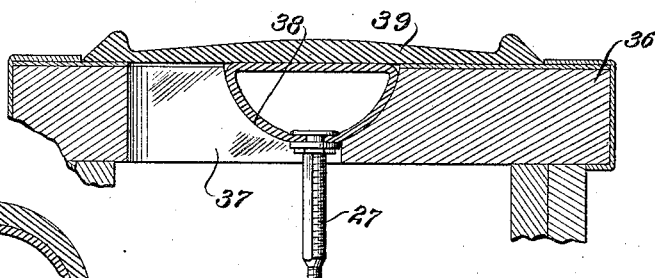
Fig. 13.
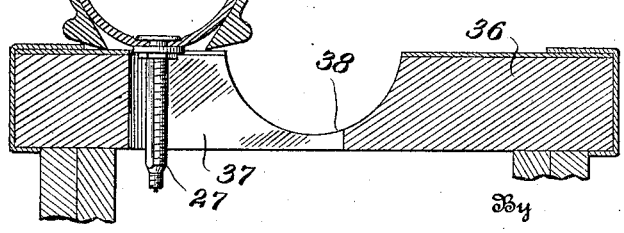
Fig. 13ª
Inventors
John Kearns,
and E. G. Webber.
By Parker Cook
Attorney

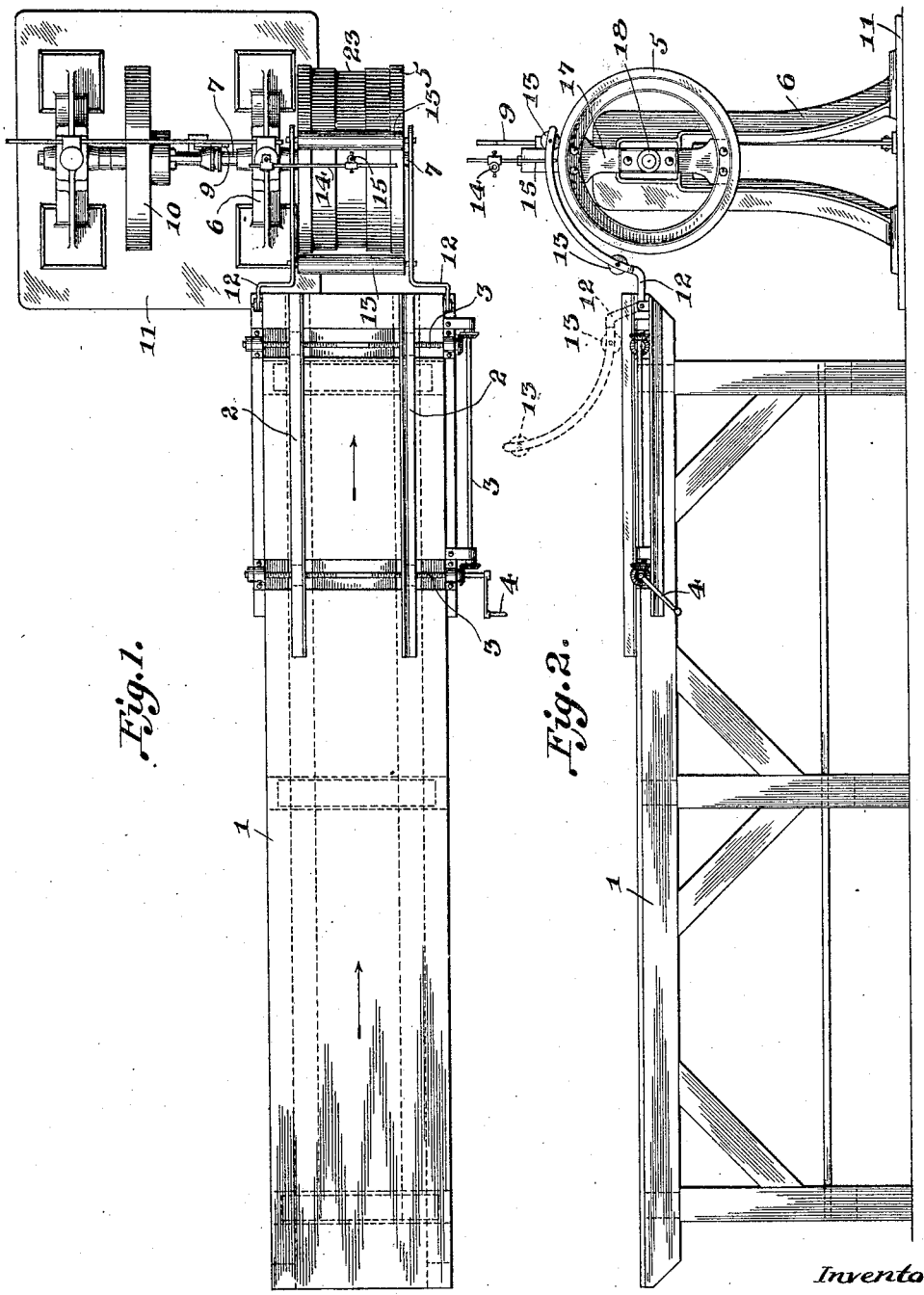

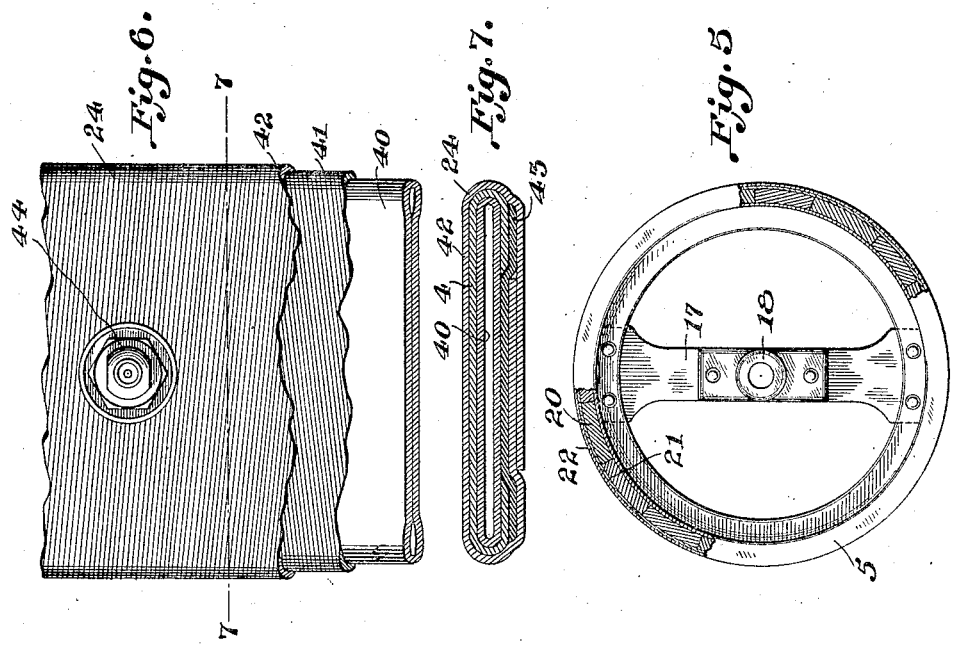

Fig. 15.
Fig. 15.a
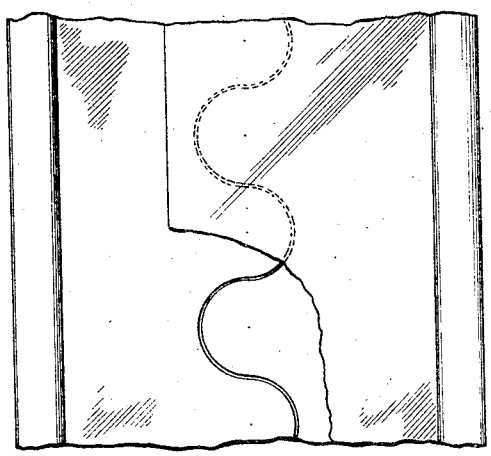
Fig. 16.
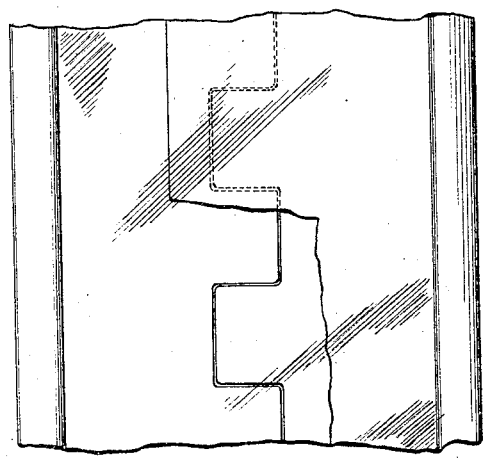
Fig. 17.
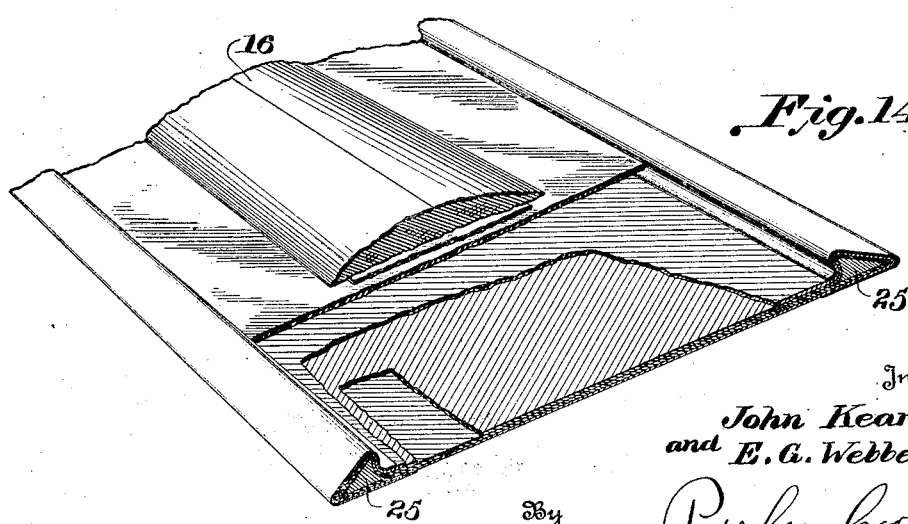
Fig. 14.
Inventors
John Kearns,
and E. G. Webber.
By Parker Cook.
Attorney Patented June 15, 1926.

UNITED STATES PATENT OFFICE.

JOHN KEARNS AND EZRA GRAY WEBBER, OF CONSHOHOCKEN, PENNSYLVANIA, ASSIGNORS OF ONE-HALF TO LEE TIRE & RUBBER COMPANY, OF CONSHOHOCKEN, PENNSYLVANIA, A CORPORATION OF PENNSYLVANIA.

METHOD OF AND APPARATUS FOR BUILDING PNEUMATIC CORD TIRES.

Application filed November 19, 1923. Serial No. 675,592.

Our invention relates to new and useful improvements in method of and apparatus for building pneumatic cord tires, and more particularly to an apparatus wherein the component parts of the tire are placed flat upon the drum and then stretched circumferentially and centrally of their edges to thereby cause the carcass to assume the desired shape.

Another object of the invention is to provide an apparatus wherein the bands or strips and the other component parts are built up on a drum, centrally of which there has previously been placed an air bag which is so constructed that it may expand circumferentially, but cannot expand horizontally in cross section. Thus, as air is applied to the bag, the component parts of the tire will be stretched circumferentially and at a point centrally between its beads or edges.

Still another object of the invention is to provide an apparatus consisting of a rotatable drum in which there is formed an annular depression centrally between its sides to receive an air bag, the latter being so constructed that it may expand or elongate circumferentially, but cannot expand in width or horizontally, so that the component parts of the tire may be stretched circumferentially and centrally of its width, while at the same time, there will be no stress or strain on the sides of the tire; in fact, they will pull or fall in as the air bag is expanded and the tire will be in the general U-shape when removed from the drum.

Heretofore, when tires have been built on drums and air bag used, it has been necessary to provide some means at the sides of the drums in the form of rings or clamps which must move inwardly as the air bags are inflated, due to the fact that the air bags would expand equally in all directions.

Another object of the present invention is to use a drum in combination with an air bag, the latter being restricted to expand in a circumferential manner, thus avoiding the necessity of clamping the rings for holding the side walls of the tire or moving them inwardly, as the bag is expanded.

Still another object of the invention is to provide a drum having a small slot therein, used in combination with a special form of air bag, so that, after the component parts of the tire are built up on the drum, one edge of the carcass may be slightly loosened by the use of a relatively flat instrument, as the drum is rotated, and then the bag inflated. The central portion of the carcass expands circumferentially, the loosened circumferential edge of the carcass sliding towards the opposite side of the drum, and at the same time, causing the said opposite side to pull slightly inwardly. Thus, the carcass, when stretched, will be substantially U-shaped, or in other words, assume the general shape of a finished tire. It might be mentioned at this time, that the apparatus is designed for making what is known as cord tires, as, of course, ordinary fabric would not stretch circumferentially and centrally between its edges.

Still another object of the invention is to provide a drum which is preferably provided with a central annular depression for the reception of an air bag which may be expanded in a circumferential manner, and to also provide the drum with slightly raised annular rims to act as guides for the placing of some of the component parts, so that the completed carcass will be correctly aligned.

Still another object of the invention is to provide an apparatus and a method wherein the cord ply fabrics may be quickly and accurately placed upon the drum, the cord plies, of course, being angularly disposed with relation to each other, so that the central portion of the tire may be circumferentially distended, and at the same time draw the side walls in, thus doing away with any clamping rings. The tire may then be left in its expanded position for a few moments, after which, it is submitted to the regular form of air bag and vulcanized in the regular way.

Still another object of the invention is to provide means for expanding circumferentially the central portion of the tire so that it will assume the desired shape, pulling the side walls in as the central portion is distended, and the entire operation, after the component parts are placed upon the drum, taking but a few seconds, thus enabling a skilled operator to make up forty or fifty carcasses in a ten hour day.

With these and other objects in view, the invention consists in certain new and novel arrangements and combination of parts, as will be hereinafter more fully explained and pointed out in the claims.

Referring now to the drawings showing a preferred embodiment and several modifications of our invention, Fig. 1 is a top plan view of the drum and its cooperating parts, together with a table for aligning the bands as they are applied to the drum;

Fig. 2 is a side view of the same showing a roller thrown back in dotted lines;

Fig. 3 is an end view of the drum and operating mechanism;

Fig. 4 is a vertical sectional view of the drum;

Fig. 5 is an end view of the drum, parts being broken away for the sake of clearness;

Fig. 6 is a fragmentary perspective of the air bag, parts being broken away for the sake of clearness;

Fig. 7 is a sectional view taken on line 7—7 of Fig. 6;

Fig. 8 is a fragmentary sectional view of the drum showing the air bag in position, and a diagrammatic view of a casing;

Fig. 9 is a similar view showing the air bag partly expanded, and the shape the carcass will assume during the inflation of the bag;

Fig. 10 shows the carcass having reached its final shape and ready to be removed;

Figs. 11 and 11ª are fragmentary sections showing slight modifications of the drum, no central depression being shown for the air bag;

Figs. 12 and 12ª show another form of modification, the depression for the air bag in this instance, being polygonal;

Figs. 13 and 13ª show another slight modification of the drum surface, a semi-circular depression being shown for the air bag;

Fig. 14 is a perspective, showing a fragmentary portion of the carcass as it is applied to the drum and before being circumferentially expanded;

Figs. 15 and 15ª are sectional views of a slightly different form of carcass which may be expanded on the drum; and Figs. 16 and 17 are fragmentary top plan views showing how the laps of the carcass, as shown in Figs. 15 and 15ª, may be interlocked.

Referring now more in detail to the drawings, and especially to Figs. 1 and 2, there is shown a relatively long table 1, at one end of which are mounted the rack bars 2 designed to move transversely of the table, these bars being operated through the gears and shaft 3 by the rotation of the handle 4, the purpose of these racks being to guide the bands correctly during their application to the drum 5. This drum 5 is suitably mounted in the pedestal 6 on the shaft 7; there also being a clutch 8 mounted on the shaft 7 operated by a handle 9, a wheel 10 being shown to which power may be supplied by a suitable motor (not shown). This drum 5 and pedestal 6 may be mounted on a base plate 11, there being no rigid connection between the table and the drum so that the drum may be moved with relation to the table, if desired.

Extending, however, from one end of the table, are the bracket arms 12 in which are placed the rubber rollers 13, the arms capable of being swung backwardly, as shown in dotted lines, and thrown forwardly after each ply or band is placed on the drum and while the drum is being rotated (as will be later mentioned) so that the plies will be smooth and fit snugly on the periphery of the drum.

There is also shown in these figures, a rod 14 on which there is a pointer 15, so that the tread 16, as seen in Fig. 14, may be centered on the plies, this rod and finger normally extending to one side, and used only when the tread is being placed on the plies.

Referring now more particularly to the specific construction of the drum, it is made up of sections, there being shown the side pieces 17 to which are bolted the hubs 18 and the fellies 19, to which fellies are fastened the arcuate sections 20, the latter being encircled with the metal sheathing 21, while over the opposite edges of the sheathing are placed the metal rims 22 which extend to the fellies 19. A central annular rim is provided in the sections 20, such as 23, this depression being for the reception of an air bag 24, to be described more fully as the specification proceeds, and to allow the air bag to lie flush with the sheathing 21 as may be seen in Fig. 8.

The purpose of the rims 22 is, that when applying the tire beads 25, as shown in Fig. 5, to the plies placed upon the drum they will be guided during their application and will be exactly the correct distance from each other.

There is provided in the drum, as shown in Fig. 3, a small slot 26 extending centrally from the drum to near one edge thereof so that the air valve 27 of the bag 24 may protrude within the drum and be supplied with air from a suitable pump.

A slightly modified form of drum is shown in Figs. 11 and 11ª, 12 and 12ª, and 13 and 13ª. In Figs. 11 and 11ª, the peripheral surface of the drum is unbroken except for the slot 29 and the guide rims 30, the latter being shown for the correct positioning of the beads 25. Figs. 12 and 12ª show a fragmentary sectional portion of the drum 31 with a slot 32; the bead guide rims 33 and polygonal depression 34 for the reception of a polygonal air bag 35 also being clearly shown. Figs. 13 and 13ª show a still further slight modification, a fragmentary section of a drum 36 being seen having the slot 37 for the reception of the air valve and a central annular depression 38 semi-circular in form to receive a semi-circular shaped air bag.

It is to be noted that the tire carcass 39 in views from 8 to 13ª, inclusive, are shown in a purely diagrammatic way for the sake of simplicity, rather than showing the separate plies and tread, as shown in perspective in Fig. 14.

As previously mentioned, the form of drum and air bag shown in Fig. 8 is the most preferable, but the other forms might be used if desired.

Referring now to the preferred form of air bag, as shown in Figs. 6, 7, 8, 9, 10, 11 and 11ª, and to Fig. 6 in particular, it will be seen that the bag 24 preferably consists of substantially an inner tube 40 around which is secured two bands 41 and 42 of cord fabric, the cord fabric being impregnated with rubber similar to the fabric used in making a cord tire. It will be noticed that the cords of the fabric extend across the tube, rather than circumferentially of the tube, the cords of the two plies 41 and 42, being slightly angularly disposed, and an extra strip of rubber 43 may be inserted as seen in Fig. 7. An ordinary air valve 44 is built into the bag so that air pressure may be quickly applied and released when desired.

We have found in practice that an air bag made up of the inner tube and the two plies, is sufficient to withstand the sixty or sixty-five pounds of air pressure used to shape the carcass, but further plies might be added, if found necessary.

By building the air bag in this manner, that is, a rubber tube and a covering of cord fabric with the cords extending across the tube, the air bag, when inflated, can stretch or elongate circumferentially, the cords separating slightly from each other, but cannot stretch or increase in size in a horizontal dimension. It is this feature, combined with the novel drum, that makes it possible to circumferentially stretch and shape the tire without the use of extra rings or clamping means, there being no outward strain on the side walls, in fact, they are pulled inwardly as the air bag is inflated.

In Figs. 12 to 13ª inclusive, the air bag is shown made of slightly different shapes, but the composite parts will, of course, be the same, and the bag only stretch or expand circumferentially.

In Figs. 15 to 17 inclusive, I have shown a different manner of arranging the several plies to be placed on the drum, Fig. 15 showing how two plies, of such length, that when folded up over the bead strips, will overlap, and Fig. 15ª showing how two plies may be overlapped on the under surface. In both instances, two plies, when doubled, act as five or six plies centrally of the tire. Figs. 16 and 17 show how two edges of the lapped plies may be interlocked centrally of the carcass. These forms of tires, however, are the subject matter of a separate application filed by us on November 19, 1923, and bearing Serial No. 675,591. When these forms of tires are built on the machine, of course, the guide rack 2 will have to be opened up as it will be appreciated that the side edges of the plies will fall below the peripheral edge of the drum before they are folded over and overlapped, as shown in Figs. 15 to 17.

Referring now to Fig. 14 which shows the preferred manner of building up the several parts of the carcass on the drum, it will be seen that it consists of four plies or bands of cord which are preferably arranged so that cords will extend at about a thirty-five degree angle to each other, the necessary beads 25, the chafing strips, gum strips, rubber cover, breaker strips and tread, all being laid in their regular order on the drum and respectively pressed by the rollers 12 and 13 as the building of the carcass proceeds.

The operation of building and shaping the tire is simple and as follows:—The air bag 24 is placed within the depression 23 in its flat state and the plies in their respective order passed along the table 1 and through the guide rack 2 and laid tightly around the drum 5; the arms 12 then thrown over and the clutch lever 9 operated so that the drum will be caused to revolve, and the roller 13 pressing the fabric, which has been cut to the desired length, tigthly around the drum.

The several plies are handled in the same manner, the cords, of course, extending at an angle to each other, after which the beads 25 are placed in position around the drum, the rims 22 acting as guides and correctly alining the beads as applied. The other component parts are added, and the tread 16 placed in position, the finger 15 being used as a guide for correctly centering the tread. The drum, of course, will be revolved as the several parts are applied and preferably by hand, so that the carcass will be stretched tightly and evenly around the drum. The operator will then take a blunt, and relatively flat instrument, throw in the clutch to cause the drum to revolve and then slip the instrument between the drum surface and the carcass to loosen up slightly the carcass on the peripheral edge of the drum that is nearest to the clutch and handle. The drum is then stopped from rotation and air pressure applied through the valve stem to the air bag, causing the carcass to expand circumferentially and centrally of its edges; this expanding action causing the carcass and bag to work to the left as shown in Figs. 9 and 10, the loosened side of the carcass sliding over towards the opposite side of the carcass and causing the side walls to draw inwardly. The bag will be expanded the desired amount and left in this expanded position for a few moments, after which the tire and the air bag may be easily slipped from off the drum, they, of course, now having a greater diameter than the drum. The carcass will then be ready for the ordinary air bag and vulcanization.

From the foregoing, it will be seen that we have produced a method of and an apparatus for building pneumatic tires wherein the carcass may be built flat upon the drum and then extended circumferentially and centrally of its edges. By forming and stretching the tires with the apparatus outlined, the carcasses will assume, when stretched, the desired shape, and at the same time, the necessity of clamping the side walls are dispensed with, inasmuch as there is no outward strain upon the side walls, the bag stretching or expanding only in a circumferential direction.

As shown in the several views, the periphery of the drum may be provided with or without an annular depression, or with an annular depression that may be one of several shapes. The purpose of the annular depression is that the air bag will be arranged centrally of the carcass when it is applied, so that the extending action occurs circumferentially and centrally of the carcass.

Furthermore, the machine is one that may be operated rapidly, a single skilled operator without the use of a helper, being able to build forty or fifty carcasses in one day. I am aware that it is old to build up a carcass upon a drum and inflate an air bag for circumferentially expanding the same, but extraneous means are used for relatively moving the side walls inwardly, this, of course calling for extra parts and two or more opertors for each machine.

The machine has proved highly efficient in service, is simple in construction and operation, and relatively cheap to manufacture.

Many slight changes might be made in the construction of the drum or the shape of the air bag, without in any way, departing from the spirit and scope of the invention.

Having thus described our invention, what we claim as new and desire to secure by Letters Patent is:—

1. An apparatus for forming cord tires comprising a drum adapted to receive a tire carcass, integral guide rims peripherally of the drum, the drum provided with a centrally positioned annular depression, a transverse slot extending through the surface of the drum, an air bag normally resting in said depression and said air bag having a valve passed through said slot, the said air bag formed of fabric cut on a bias for restricting expansion to a circumferential direction, and adapted to thereby expand a carcass to be placed about the drum, and said air bag adapted to move out of said depression and moving the carcass to one side of the drum when said air bag is expanded.

2. An apparatus for building a tire comprising a drum having a central depression peripherally thereof, the surface of the drum provided with a slot extending from its center to near its opposite edge for the reception of a tube, in combination with an air bag having a tube extending through said slot and said bag capable of expanding circumferentially and adapted to move laterally of the drum when the tube is expanded.

3. A method of stretching a flat cord tire carcass to tire shape which consists in building a complete carcass upon a rotatable drum, loosening one side of the carcass, expanding the said carcass centrally and circumferentially by the use of a circumferentially expanding air bag and one edge of the carcass and air bag moving laterally of the drum from the center to one side as the air bag is expanded.

4. A method of forming and stretching a tire carcass, consisting of building the carcass flat upon a circular form, loosening one edge of the carcass only, expanding the central portion of the carcass only in a circumferential direction, the expansion of the carcass centrally moving the carcass from its loosened edge across the drum to one side thereof.

5. A method of forming and stretching a tire carcass consisting of building a carcass flat upon a circular drum, loosening one edge of the carcass only, expanding the carcass centrally so that the loose end moves over beyond the center of the drum towards the unloosened end, and the completed expanded tire occupying one peripheral edge of the drum.

6. The method of forming and stretching a tire carcass consisting of building a carcass flat upon a circular form, loosening one peripheral edge of the carcass, expanding the carcass centrally of the form and causing the major portion of the carcass to pull across the major surface of the drum.

In testimony whereof we affix our signatures.

JOHN KEARNS.
EZRA GRAY WEBBER.